United States Patent Office 2,814,554
Patented Nov. 26, 1957

2,814,554

GRINDING WHEELS

Robert A. Rowse, Shrewsbury, Mass., assignor to Norton Company, Worcester, Mass., a corporation of Massachusetts No Drawing. Application December 31, 1954,
Serial No. 479,245

5 Claims. (Cl. 51—298)

The invention relates to grinding wheels.

One object of the invention is to provide a wheel which will give a higher quality number when grinding stainless steel billets, a very difficult goal to achieve. The BB quality number is referred to which is material removed squared in pounds avoirdupois divided by the wheel wear in cubic inches, both quantities resulting from the same grinding operation and exactly the same space of time. This calculation has for a long time now been used to measure the value of a snagging wheel for snagging stainless steel billets. Simple efficiency ratio of material removed to wheel wear gives the same rating to a slow cutting wheel provided its wheel wear is proportionately low and such a wheel is of less value than one having a higher rate of cut with a proportionately high wheel wear since the operator's time is of value and so is the overhead of the manufacturer.

Another object of the invention is to produce a snagging wheel of high BB quality number and low degree of burn. Another object of the invention is to provide a method for making superior snagging wheels which are grinding wheels giving superior results in snagging operations. Another object of the invention is to provide a method involving specific orders of mixing ingredients which will produce greatly superior grinding wheels as compared with those which can be produced out of the same materials mixed in a different manner.

Other objects will be in part obvious or in part pointed out hereinafter.

In the manufacture of abrasive articles it is just as much the rule as it is in the manufacture of many other materials that usually the dilution of the best material for a particular use or purpose with any other material, even though only slightly inferior to the best, results in a material which is inferior to the best. This is the rule that superior material cannot be diluted with inferior materials without obtaining inferior results. It is therefore surprising that I have been able to take the heretofore best grinding wheel composition for producing snagging wheels for snagging stainless steel billets and dilute it with a composition which was always found to be somewhat inferior to the best for the manufacture of grinding wheels for snagging stainless steel billets and have thereby produced a still better snagging wheel.

I have found that superior snagging wheels as measured by the BB quality number can be produced by the use of a combination of rubber (natural) and phenol-formaldehyde resin as the bond provided the abrasive and the bond components are compounded in a particular manner. How this is done will presently be explained.

I made six kinds of snagging wheels and tested all kinds, as identified in the following table which gives the percentage of rubber abrasive mix under the heading "Rubber," the percentage of phenol-formaldehyde abrasive mix under the heading "Resin," both percentages being by weight, the wheel wear in cubic inches per hour under the heading "WW," the material (stainless steel billets) removed in pounds per hour under the heading "MR," the BB Quality number which is MR squared divided by WW under the heading "BB Quality," and the degree of burn which is a visual estimate with 0 representing none and 4 representing a severe burn under the heading "Burn." All of the wheels were originally 16 x 2 x 6, that is 16 inches in diameter, 2 inches thick with a 6 inch central hole. All were tested at 2250 R. P. M. and the figures reported are for wheels that were originally full diameter, giving a surface velocity of 9500 surface feet per minute. This is an optimum speed for grinding stainless steel billets. At the left is the wheel number for identification.

TABLE I

| Wheel No. | Rubber, percent | Resin, percent | WW | MR | BB quality | Burn |
|---|---|---|---|---|---|---|
| 1 | 0 | 100 | 5.8 | 8.9 | 14 | 4 |
| 2 | 25 | 75 | 18.6 | 17.0 | 16 | 1 |
| 3 | 50 | 50 | 33.2 | 20.0 | 12 | 1 |
| 4 | 75 | 25 | 46.1 | 22.2 | 11 | 1 |
| 5 | 100 | 0 | 56.8 | 22.7 | 9.1 | 0 |
| 6 | 0 | 100 | 35.2 | 18.5 | 9.7 | 2 |

Mix A

In order to make wheels Nos. 1, 2, 3 and 4, I took 66.2 lbs. of abrasive, 36 grit size regular aluminum oxide and wetted this with 150 cubic centimeters of furfural in a vertical spindle mixer, then added 10.04 lbs. of powdered phenol-formaldehyde reactive resin, BR2417 brand, plus 14.91 lbs. iron pyrites, plus 7.46 lbs. potassium fluoborate plus 1.39 lbs. of unslaked lime, CaO. The mixing was continued until all of the grains had picked up all possible of the solids and then 200 cubic centimeters of anthracene oil as a dust layer was added.

Mix B

Mix B was made exactly like Mix A only using 82.6 lbs. of 36 grit size regular aluminum oxide wetted with 400 cubic centimeters of furfural. After coating the aluminum oxide abrasive with the furfural, I added 8.91 lbs. of the same resin plus 4.84 lbs. of iron pyrites plus 2.45 lbs. of potassium fluoborate plus 1.20 lbs. of unslaked lime, CaO, and later on added 400 cubic centimeters of anthracene oil as a dust layer. This was for the manufacture of wheel No. 6.

Mix C

For the manufacture of wheels Nos. 2, 3, 4 and 5, I took 90.70 lbs. of abrasive 36 grit size regular aluminum oxide and coated this with 6.20 lbs. of liquid rubber (which can be obtained on the open market) and 3.10 lbs. of sulphur in a kneader mixer. I then mixed 82.4 lbs. of this mix with 8.20 lbs. of powdered phenol-formaldehyde reactive resin BR2417 brand, plus 7.50 lbs. of cryolite plus 1.60 lbs. of unslaked lime, CaO, and .30 lb. of polyvinylidene chloride in a vertical spindle mixer.

EXAMPLE 1

For the manufacture of wheel No. 1 I took 44.06 lbs. of Mix A, screened it and charged it into a mold of size to make a wheel of the size given and pressed in a hot press under a pressure of about one-half ton per square inch at a temperature of 160° C. for one hour. Thereafter the wheel was heated in an oven at a temperature of 140° C. for 24 hours.

EXAMPLE 2

For the manufacture of wheel No. 2 I took 25% by volume of Mix C and added it to 75% by volume of Mix A and blended these mixtures in a vertical spindle mixer. I then charged 42.36 lbs. of this mixture into the same size mold and hot pressed and cured the wheel as above described in the case of Example 1.

EXAMPLE 3

Wheel No. 3 was made the same way as wheel No. 2 of Example 2 except that the proportions were one-half by volume Mix C and one-half by volume Mix A. 40.81 lbs. were used.

EXAMPLE 4

Wheel No. 4 was made in the same manner and out of the same ingredients as wheels Nos. 2 and 3 except that the proportions were 75% by volume of Mix C and 25% by volume of Mix A. 39.12 lbs. were used.

EXAMPLE 5

Wheel No. 5 was made out of Mix C and nothing else. The molding, hot pressing and later curing in an oven were as described in Example 1. 37.40 lbs. of mix were used.

EXAMPLE 6

Wheel No. 6 was made out of 35.71 lbs. of Mix B and nothing else. This wheel was charged into the same size mold which, however, was cold pressed under a pressure of about two tons per square inch. Then the wheel, after stripping from the mold, was cured in an oven at a temperature of 175° C. for 18 hours.

Referring now to Table I, wheel No. 1 gave a bad burn and wheels Nos. 5 and 6 had low quality numbers. These wheels are outside of the scope of the invention but wheels Nos. 2, 3 and 4 are within the scope of the invention. In wheels having from 10 volume percent of phenol-formaldehyde abrasive composition to 90 volume percent thereof, the remainder abrasive rubber composition, the advantages of the invention are achieved.

In the final wheel each abrasive grain is coated with either matured phenol-formaldehyde resin composition or with hard sulphur vulcanized rubber composition and those of the one kind are well mixed with those of the other kind so that each phase of the wheel is well distributed with the other phase of the wheel. The resin composition is bonded to more resin composition and to rubber composition and the rubber composition is bonded to more rubber composition and to resin composition. Wheels according to the invention are accordingly two phase wheels with the two different abrasive compositions well mixed and distributed. However each grain is individually coated with bond and there are at least 2% of pores in the wheel. Wheels according to the invention are to be sharply distinguished from wheels consisting of abrasive grains in a matrix of hard rubber whether including some phenolic resin or not. A different grinding action appears to be achieved when two separate mixes, the one being abrasive and essentially rubber and the other being abrasive and essentially phenolic resin, are made and the wheels are made from a mixture of the two separate mixes. No amount of phenol-formaldehyde reactive resin, whether small or large, added to rubber will, as a bond, produce a grinding wheel which has the same abrasive action of wheels according to the present invention. One way to describe this is to say that the abrasive grains are each individually and completely coated with the respective materials. Another way is to state that more than 99% of the abrasive grains are free of contact with other abrasive grains and this is probably the real secret of the superiority of wheels made out of separate mixes as described.

By phenol-formaldehyde resin composition I intend to include fillers such as the iron pyrites and potassium fluoborate heretofore mentioned, and by rubber composition I also intend to include fillers and less than 50% by weight of any resin. Included within the description phenol-formaldehyde resin composition is also the resultant of whatever dehydrating agent such as lime was used and also the resultant of the small amount of anthracene oil added. Vulcanizing promoters for the rubber and curing agents such as hexamethylenetetramine which is found in the reactive resin BR2417 are included. In the abrasive industry as in many others, resin and rubber compositions include the normal materials usually associated therewith and especially in the case of abrasive compositions grinding promoters referred to as fillers are included. The compositions constitute the bond that unites the abrasive grains together to form an integral abrasive body or wheel and in this bond is usually some inert material such as those mentioned and such inert material as in the case of carbon black used as a rubber filler actually strengthens the composition in most cases. By hard sulphur vulcanized rubber composition I define vulcanized rubber containing at least 10% of sulphur on the rubber molecule content. The furfural used is known in the art as a plasticizer as it promotes moldability. It is a solvent for the solid components of the phenol-formaldehyde reactive resin. Other solvents could be used. A specific example of a widely used solvent for the reactive finely divided solid phenol-formaldehyde resin is liquid phenol-formaldehyde resin which, from the fact of its being a liquid, is of course reactive and uncured. Both furfural and liquid resin react with the solid components of the resin to form the polymer.

It will be seen that I make a mixture out of two mixes using from 10% to 90% by weight of the mix of abrasive grains and unvulcanized rubber composition with its complement of the mix of abrasive grains and reactive phenol-formaldehyde resin composition. The word "complement" is used in its usual sense and means that whatever percentage of the abrasive rubber composition I took, substantially all of the balance was abrasive reactive phenol-formaldehyde resin composition. In each case practically all of the grains were substantially completely coated with the composition involved. Within the scope of the invention heat and pressure can be applied simultaneously or the combined mixture in the mold can be first pressed and then, after stripping the pressed wheel from the mold, then known as a "green" wheel, it can be cured by heat to mature the phenol-formaldehyde and to vulcanize the rubber. The temperature to which the wheels are raised together with the length of time of the heat treatment for curing should be sufficient to convert the phenol-formaldehyde components to the thermo-irreversible stage and to vulcanize the rubber. There is probably some cross-linking between the cured resin components and the vulcanized rubber components which adds strength to the wheels.

It will thus be seen that there has been provided by this invention a grinding wheel in accordance with which the various objects hereinabove set forth together with many thoroughly practical advantages are successfully achieved. As many possible embodiments may be made of the above invention and as many changes might be made in the embodiment above set forth, it is to be understood that all matter hereinbefore set forth is to be interpreted as illustrative and not in a limiting sense.

I claim:

1. Method of making organic bonded grinding wheels which comprises, preparing a mix of abrasive grains and rubber composition by first thoroughly coating all of the individual grains with liquid rubber and thereafter adding thereto solid components of rubber composition in finely divided form, said solid components of rubber composition containing at least 10% by weight of sulphur on the rubber molecule of the rubber composition, and thoroughly mixing said solid components with the abrasive grains individually coated with liquid rubber until each grain is substantially completely covered with the said solid components, preparing a mix of abrasive grains and phenol-formaldehyde resin composition by first thoroughly coating all of the individual grains with a solvent for reactive solid finely divided phenol-formaldehyde resin composition, then adding said solid finely divided phenol-formaldehyde resin composition thereto and thoroughly mixing it with said grains coated with resin solvent until each grain is substantially completely covered with the said reactive solid phenol-formaldehyde resin composition, then thoroughly mixing from 10% to 90% by weight of the mix of abrasive grains and unvulcanized rubber composition with its complement of the mix of abrasive grains and reactive phenol-formaldehyde resin composition to make a thorough mixture of the two mixes, then charging a mold with said mixture and forming a grinding wheel by pressure and heat to compact the mixture and to vulcanize the rubber and to react the resin to thermo-irreversible stage.

2. Method according to claim 1 in which the pressure and heat are at least initially applied simultaneously.

3. Method according to claim 1 in which the mixture is first pressed cold in the mold, then cured by heating the compacted mixture without the use of pressure.

4. An abrasive article comprising a mixture of from 10% to 90% by volume of abrasive grains each individually and completely coated with a coating of matured phenol-formaldehyde resin composition and from 90% to 10% by volume of abrasive grains each individually and completely coated with a coating of hard sulfur vulcanized rubber composition, said resin coated grains and said rubber coated grains being well mixed and bonded to each other by unions of the coatings of the grains which unions leave more than 99% of all the abrasive grains free of contact with one another, said grains with their resin coatings and grains with their rubber coatings accounting for substantially the entire mass of the abrasive article and said wheel having at least 2% by volume of pores.

5. Method of making organic bonded abrasive articles which comprises preparing a first batch of abrasive grains which are covered with a coating of rubber composition by thoroughly mixing a quantity of loose abrasive grains with a fluid, sulfur-containing rubber composition until the individual grains substantially all become covered with the rubber composition, separately preparing a second batch of abrasive grains which are covered with a coating of reactive phenol-formaldehyde resin composition by thoroughly mixing a quantity of loose abrasive grains with a phenol-formaldehyde resin composition until the individual grains substantially all become covered with the resin composition, then mixing from 10% to 90% by weight of said first batch with its complement of said second batch until a uniform mixture of the two batches is obtained, charging a mold with said mixture and forming an abrasive article by pressure and heat to compact the mixture, to vulcanize the rubber and to cure the resin.

References Cited in the file of this patent

UNITED STATES PATENTS

| | | |
|---|---|---|
| 1,989,243 | Nash et al. | Jan. 29, 1935 |
| 2,733,987 | Gartrell et al. | Feb. 7, 1956 |

FOREIGN PATENTS

| | | |
|---|---|---|
| 708,838 | Great Britain | May 12, 1954 |